United States Patent
Jiang

(10) Patent No.: US 12,373,504 B2
(45) Date of Patent: Jul. 29, 2025

(54) METHOD FOR RECOMMENDING A SEARCH TERM, METHOD FOR TRAINING A TARGET MODEL AND ELECTRONIC DEVICE

(71) Applicant: Baidu Online Network Technology (Beijing) Co., Ltd., Beijing (CN)

(72) Inventor: Fuchun Jiang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 621 days.

(21) Appl. No.: 17/398,134

(22) Filed: Aug. 10, 2021

(65) Prior Publication Data
US 2021/0365515 A1 Nov. 25, 2021

(30) Foreign Application Priority Data
Dec. 25, 2020 (CN) .......... 202011563137.X

(51) Int. Cl.
*G06F 16/9535* (2019.01)
*G06F 16/951* (2019.01)
*G06F 16/9532* (2019.01)

(52) U.S. Cl.
CPC ........ *G06F 16/9535* (2019.01); *G06F 16/951* (2019.01); *G06F 16/9532* (2019.01)

(58) Field of Classification Search
None
See application file for complete search history.

(56) References Cited

U.S. PATENT DOCUMENTS

2004/0225498 A1* 11/2004 Rifkin .................. G10L 17/02
704/250
2015/0161201 A1 6/2015 Sadikov et al.
(Continued)

FOREIGN PATENT DOCUMENTS

CN 110619076 12/2019
CN 110795612 2/2020
(Continued)

OTHER PUBLICATIONS

Extended European Search Report EP 21187193.4 (Jan. 14, 2022) (12 pages).
(Continued)

*Primary Examiner* — Kannan Shanmugasundaram
(74) *Attorney, Agent, or Firm* — HSML P.C.

(57) ABSTRACT

A method for recommending a search term, an electronic device and a storage medium are provided. The method includes: acquiring an input target search term; determining a neighbor node of a current node and a relationship between the current node and the neighbor node, by taking the target search term as the current node; performing semantic representation processing on first text information of the current node and second text information of the neighbor node respectively, to obtain a first semantic representation of the current node and a second semantic representation of the neighbor node; obtaining a semantic aggregation representation of the target search term according to the first semantic representation, the second semantic representation and the relationship between the current node and the neighbor node; and recalling a candidate search term to be recommended from a set of candidate search terms, by taking the semantic aggregation representation as an index.

12 Claims, 9 Drawing Sheets

(56) References Cited

U.S. PATENT DOCUMENTS

| | | | |
|---|---|---|---|
| 2018/0181648 A1 | 6/2018 | Yanfeng | |
| 2019/0057159 A1 * | 2/2019 | Chen et al. | |
| 2019/0384831 A1 * | 12/2019 | Alonso | G06F 16/2457 |
| 2020/0286146 A1 * | 9/2020 | Song | G06F 16/9024 |
| 2020/0302018 A1 | 9/2020 | Turkkan et al. | |

FOREIGN PATENT DOCUMENTS

| | | |
|---|---|---|
| JP | 2005-302043 | 10/2005 |
| JP | 2011-103020 | 5/2011 |
| JP | 2012-133520 | 7/2012 |

OTHER PUBLICATIONS

Notice of Reasons for Refusal JP 2021-116392 (Sep. 1, 2022) (8 pages).

Notice of Preliminary Rejection, issued in corresponding Korean patent application No. 10-2021-0164526, dated May 29, 2024, 19 pages.

* cited by examiner

METHOD FOR RECOMMENDING A SEARCH TERM, METHOD FOR TRAINING A TARGET MODEL AND ELECTRONIC DEVICE

CROSS-REFERENCE TO RELATED APPLICATION

This application claims priority to Chinese patent application No. 202011563137.X, filed on Dec. 25, 2020, which is hereby incorporated by reference in its entirety.

TECHNICAL FIELD

The present disclosure relates to the technical field of computers, and in particular to the field of information processing.

BACKGROUND

With the rapid development of an Internet technology and a smart mobile terminal technology, a user can search for demand information through a smart terminal such as a computer or a mobile phone. In a case where information is searched, the user inputs a search term (query) to seek valuable information, and an electronic device performs information matching in network large data based on the search term, and outputs a query result.

SUMMARY

The present disclosure provides a method for recommending a search term, a method for training a target model, an apparatus, an electronic device, a storage medium and a product.

According to a first aspect of the present disclosure, a method for recommending a search term is provided, which includes:
  acquiring an input target search term;
  determining a neighbor node of a current node and a relationship between the current node and the neighbor node, by taking the target search term as the current node;
  performing semantic representation processing on first text information of the current node and second text information of the neighbor node respectively, to obtain a first semantic representation of the current node and a second semantic representation of the neighbor node;
  determining a semantic aggregation representation of the target search term, based on the first semantic representation, the second semantic representation and the relationship between the current node and the neighbor node; and
  recalling a candidate search term to be recommended from a set of candidate search terms, by taking the semantic aggregation representation of the target search term as an index.

According to a second aspect of the present disclosure, a method for training a target model is provided, which includes:
  inputting a sample search term in a training sample into a preset first network model of a preset model, to obtain a neighbor node taking the sample search term as a current node, and a relationship between the current node and the neighbor node, which are output by the preset first network model of the preset model;
  inputting first text information of the current node and second text information of the neighbor node into a preset second network model of the preset model, to obtain a first semantic representation of the current node and a second semantic representation of the neighbor node which are output by the preset second network model;
  inputting the first semantic representation of the current node and the second semantic representation of the neighbor node into a preset third network model of the preset model, to obtain a semantic aggregation representation of the sample search term output by the preset third network model;
  determining a loss function, based on the neighbor node taking the sample search term as the current node, the relationship between the current node and the neighbor node, the semantic aggregation representation of the sample search term, semantic aggregation representation labels of respective nodes in the training sample and labels of relationships between the respective nodes; and
  updating the preset model by performing a reverse conduction according to the loss function, to obtain the target model.

According to a third aspect of the present disclosure, an apparatus for recommending a search term is provided, which includes:
  an acquisition module configured for acquiring an input target search term;
  a first determination module configured for determining a neighbor node of a current node and a relationship between the current node and the neighbor node, by taking the target search term as the current node;
  a second determination module configured for performing semantic representation processing on first text information of the current node and second text information of the neighbor node respectively, to obtain a first semantic representation of the current node and a second semantic representation of the neighbor node;
  an aggregation representation module configured for determining a semantic aggregation representation of the target search term, based on the first semantic representation, the second semantic representation and the relationship between the current node and the neighbor node; and
  a recalling module configured for recalling a candidate search term to be recommended from a set of candidate search terms, by taking the semantic aggregation representation as an index.

According to a fourth aspect of the present disclosure, an apparatus for training a target model is provided, which includes:
  a first information determination module configured for inputting a sample search term in a training sample into a preset first network model of a preset model, to obtain a neighbor node taking the sample search term as a current node, and a relationship between the current node and the neighbor node, which are output by the preset first network model of the preset model;
  a second information determination module configured for inputting first text information of the current node and second text information of the neighbor node into a preset second network model of the preset model, to obtain a first semantic representation of the current node and a second semantic representation of the neighbor node which are output by the preset second network model;

a third information determination module configured for inputting the first semantic representation of the current node and the second semantic representation of the neighbor node into a preset third network model of the preset model, to obtain a semantic aggregation representation of the sample search term output by the preset third network model; and a training module configured for determining a loss function, based on the neighbor node taking the sample search term as the current node, the relationship between the current node and the neighbor node, the semantic aggregation representation of the sample search term, semantic aggregation representation labels of respective nodes in the training sample and labels of relationships between the respective nodes; and updating the preset model by performing a reverse conduction according to the loss function, to obtain the target model.

According to a fifth aspect of the present disclosure, an electronic device is provided, which includes:

at least one processor; and a memory communicatively connected with the at least one processor, wherein the memory stores instructions executable by the at least one processor, the instructions being executed by the at least one processor to enable the at least one processor to perform the method according to any one of the above mentioned aspects.

According to a sixth aspect of the present disclosure, there is provided a non-transitory computer-readable storage medium storing computer instructions for enabling a computer to perform the method according to any one of the above mentioned aspects.

According to a seventh aspect of the present disclosure, there is provided a computer program product comprising a computer program which, when executed by a processor, causes the processor to perform the method according to any embodiment of the present disclosure.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the scheme and do not constitute a limitation to the present disclosure. In which.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
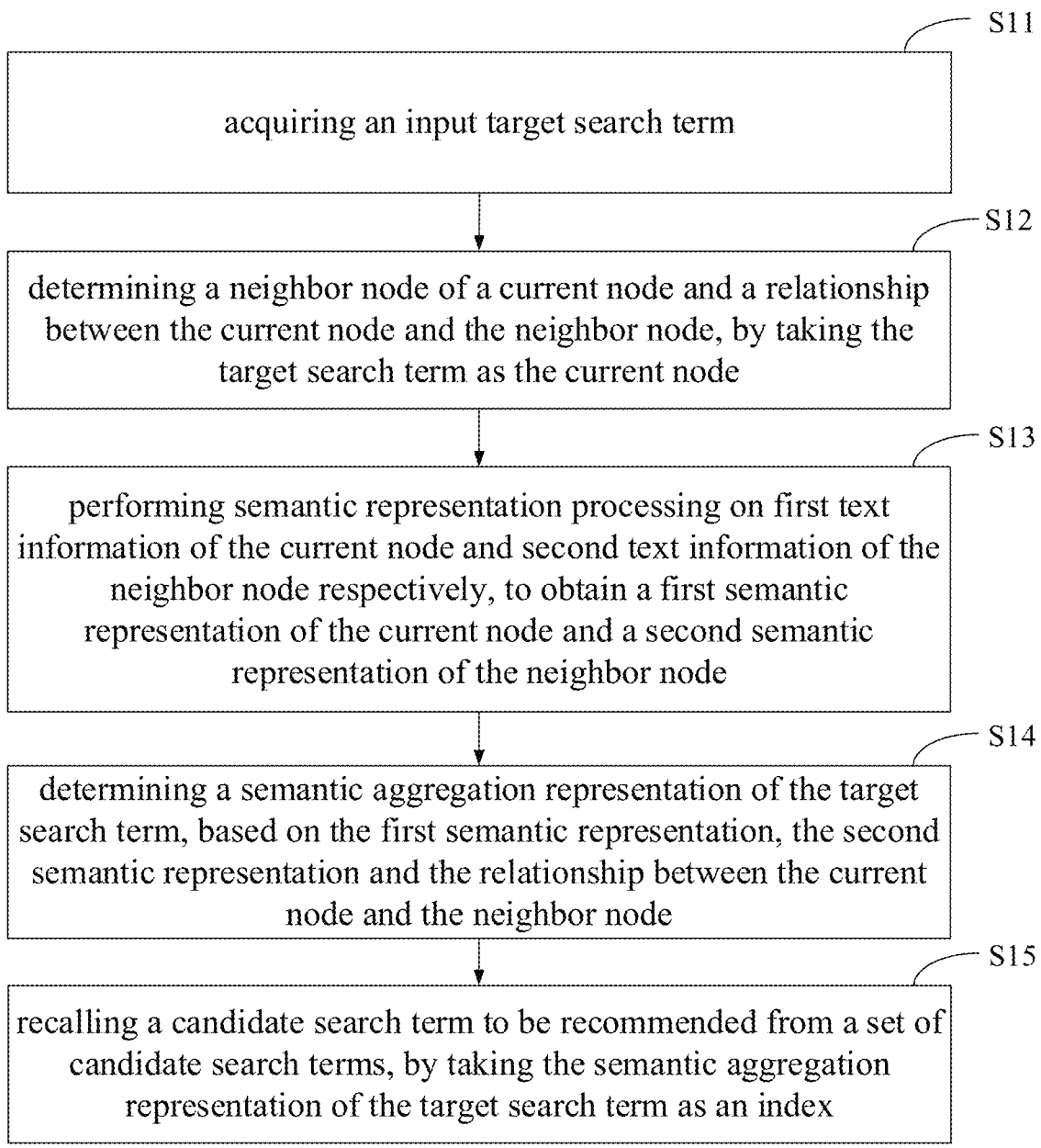
FIG. 1 is a flowchart for a method for recommending a search term according to an embodiment of the present disclosure.

FIG. 1 illustrates a schematic diagram for a method for recommending a search term according to an embodiment of the present disclosure. The method may be applied to an electronic device including, but not limited to, a stationary device and/or a mobile device. For example, the stationary device includes, but is not limited to, a server, which may be a cloud server or a general server. For example, the mobile device includes, but is not limited to, one or more of a cell phone and a tablet computer. As shown in FIG. 1, the method includes:

S11, acquiring an input target search term;

S12, determining a neighbor node of a current node and a relationship between the current node and the neighbor node, by taking the target search term as the current node;

S13, performing semantic representation processing on first text information of the current node and second text information of the neighbor node respectively, to obtain a first semantic representation of the current node and a second semantic representation of the neighbor node;

S14, determining a semantic aggregation representation of the target search term, based on the first semantic representation, the second semantic representation and the relationship between the current node and the neighbor node; and S15, recalling a candidate search term to be recommended from a set of candidate search terms, by taking the semantic aggregation representation of the target search term as an index.

According to the technical solution of the present disclosure, the accuracy rate of a recommended candidate search term can be improved.

Here, the target search term (also referred to as query) in S11 is information input by a user on a terminal device. Illustratively, the target search term may contain one or more of following information: a person name, an item name, time, a location, and an event. For example, in a case where the user inputs "singer AAA", a target search term is "singer AAA". As another example, in a case where the user inputs "Development History of the company A", a target search term is "Development History of the company A". After the terminal device receives an input operation of the user, the terminal device acquires a target search term according to the input operation, and sends the target search term to the electronic device.

A plurality of candidate search terms are stored in the set of candidate search terms, and the number of candidate search terms to be recommended is not limited in the present disclosure. In a practical application, the number of candidate search terms to be recommended can be set according to design or user requirements.

Since the number of searches for different target search terms may be different, the number of neighbor nodes may be different for different nodes. For example, there are i neighbor nodes corresponding to a high-frequency target search term A, and there are j neighbor nodes corresponding to a low-frequency target search term B, wherein i is a positive integer, j is a positive integer, and i is not equal to j.

The semantic aggregation representation in S14 is a semantic representation of a cluster aggregated by the current node and the neighbor node.

In some implementations, in S12, determining the neighbor node of the current node and the relationship between the current node and the neighbor node, by taking the target search term as the current node may be realized in at least one of the following manners:
   acquiring a historical search record of a user, and determining a historical search term in the historical search record as a neighbor node;
   acquiring display webpage information during searching, and determining a webpage title in the display webpage information as a neighbor node; or
   acquiring co-occurrence information of historical search terms in a historical search log, establishing a dictionary in a key value pair format with the historical search terms as keys and the co-occurrence information as values, and acquiring the neighbor node in a word searching mode.

For example, for the current search of the singer AAA, in a case where it may find a co-linear relationship among the singer AAA, a singer BBB and a singer CCC from the historical search log, a dictionary will be built with AAA as a key, and BBB and CCC as values, and neighbor nodes such as BBB and CCC are acquired by querying the dictionary for the current search term.

In a practical application, how to specifically determine the neighbor node of the current node may be accomplished in one or more of the above-described manners. Of course, other manners which can determine a neighbor node may be used to determine the neighbor node of the current node, and the present disclosure is not limited in this respect.

The method for recommending a search term according to the present embodiment determines a neighbor node of a current node by taking the target search term as the current node, determines a semantic aggregation representation of the target search term based on the first text information of the current node and the second text information of the neighbor node, and recalls a candidate search term to be recommended from a set of candidate search terms, by taking the semantic aggregation representation as an index. Compared with determining a candidate search term only according to a semantic representation corresponding to a current node, because the semantic aggregation representation is a semantic representation of a cluster aggregated by the current node and the neighbor node, it solves the problem of a poor search effect caused by the problems of uncertainty or inaccuracy of the target search term and the like to the search operation, so that more accurate candidate search terms to be recommended can be recalled, thereby helping the user to search according to the recommended candidate search term. Thus, the searching operation process is simplified, the searching difficulty is reduced, the searching efficiency of the user is improved, and the searching experience of the user is improved.

In some implementations, S12, S13 and S14 may be implemented by a trained target model for outputting semantic aggregation features.

How to train to obtain a target model will be described below.

Figure 2:
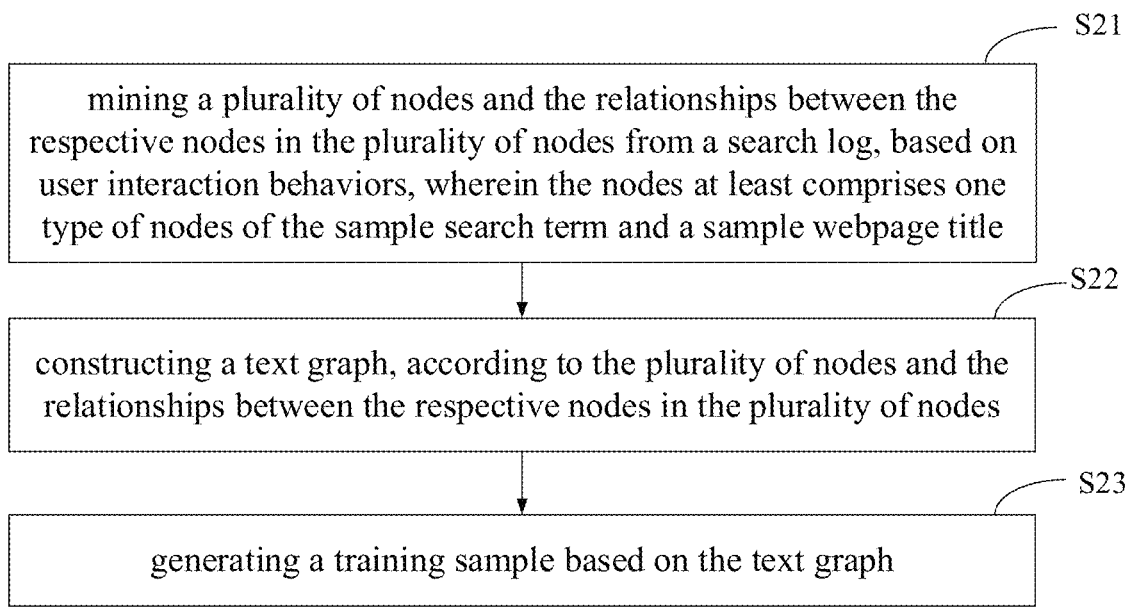
FIG. 2 is a flowchart for acquiring a training sample according to an embodiment of the present disclosure.

In order to conveniently determine the semantic aggregation representation based on the first text information of the current node and the second text information of the neighbor node thereof, a preset model needs to be trained first, to obtain a target model capable of outputting a semantic aggregation representation. However, a training sample is required to train the preset model. In an embodiment of the present disclosure, on the basis of realizing any one of the above methods, as shown in FIG. 2, the method may further include:
   S21, mining a plurality of nodes and the relationships between the respective nodes in the plurality of nodes from a search log, based on user interaction behaviors, wherein the plurality of nodes at least includes one type of nodes of the sample search term and a sample webpage title;
   S22, constructing a text graph, according to the plurality of nodes and the relationships between the respective nodes in the plurality of nodes; and
   S23, generating a training sample based on the text graph.

Through the above implementations, a good training sample can be obtained by constructing a text graph according to a plurality of nodes and the relationships between the respective nodes in the plurality of nodes, so that the trained target model can output a more accurate semantic aggregation representation.

In some implementations, manners for determining the relationships between the respective nodes in the plurality of nodes include at least one of:
   determining a first type of relationship between the sample search terms;
   determining a second type of relationship between the sample search term and the sample webpage title; and
   determining a third type of relationship between the sample webpage titles.

A particular implementation may include determining at least one of a co-occurrence relationship in which two sample search terms simultaneously appear in one search time domain, a co-display relationship in which two sample search terms display a same sample webpage title together, and a concurrent relationship in which two sample search terms click a same sample webpage title together, as the first type of relationship between the sample search terms.

A particular implementation may include determining at least one of a display relationship in which a sample webpage title is recalled and displayed in a scenario of searching a search term, a click relationship in which a webpage title is clicked in a scenario of searching a sample search term, and a text matching relationship in which a sample search term and a webpage title have a text containing relationship, as the second type of relationship between the sample search term and the sample webpage title.

A particular implementation may include determining at least one of a co-display relationship in which two sample webpage titles are displayed simultaneously in a same search and a concurrent relationship in which two sample webpage titles are clicked simultaneously in a same search, as the third type of relationship between the sample webpage titles.

Figure 3:
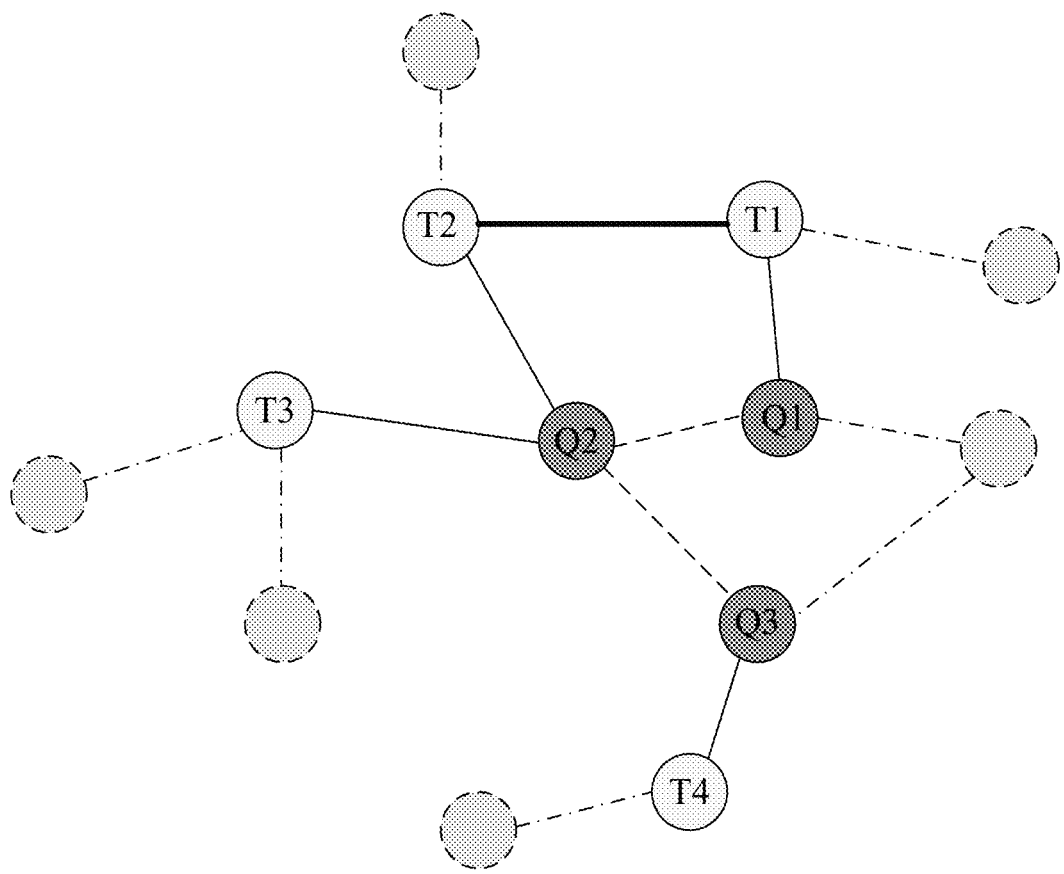
FIG. 3 shows an example of a text graph in an embodiment of the present disclosure.

FIG. 3 is an example of a text graph. As shown in FIG. 3, Q1, Q2, and Q3 all represent search terms, T1, T2, T3, and T4 all represent webpage titles, and in various connection lines in FIG. 3, a thick solid line represents a connection edge between webpage titles, i.e., the third type of relationship; a thin solid line represents a connection edge between a search term and a webpage title, i.e., the second type of relationship; and a dotted line represents a connection edge between search terms, i.e., the first type of relationship. It should be understood that the text graph shown in FIG. 3 is merely schematic. For example, T1 represents "Ten Classical Songs of the king of singing, AAA, worth hearing a hundred times for a single cycle", and T2 represents "Hit songs for years, touching souls! The classic songs of the singer AAA in those years, T3 represents "Classical song 'DDD' of the singer AAA", T4 represents "the birthday of the singer AAA, rewarming this movie will certainly let you have a new understanding of his performing skills", Q1 represents "the songs of the singer AAA", Q2 represents "the classic songs of the singer AAA", and Q3 represents "the songs of the singer AAA from the films and televisions".

Through the above implementation, an intention of one semantic cluster can be obtained by mining nodes and the relationship between the nodes; the text graph constructed according to the nodes and the relationship between the nodes is taken as a training sample, so that the trained target model can capture semantic information of a node itself and surrounding nodes thereof, and acquire semantic aggregation representation of each node. By this time, the representation of the nodes is a representation of a cluster aggregated by the nodes themselves and the neighbor nodes, and a more accurate semantic aggregation representation can be output.

It should be explained that in a production application of predicting a candidate search term to be recommended, a text graph is not required to be constructed, only the determined first text information of the current node and the determined second text information of the neighbor node are required to be input into a target model, and a text aggregation feature is output by the target model.

Figure 4:
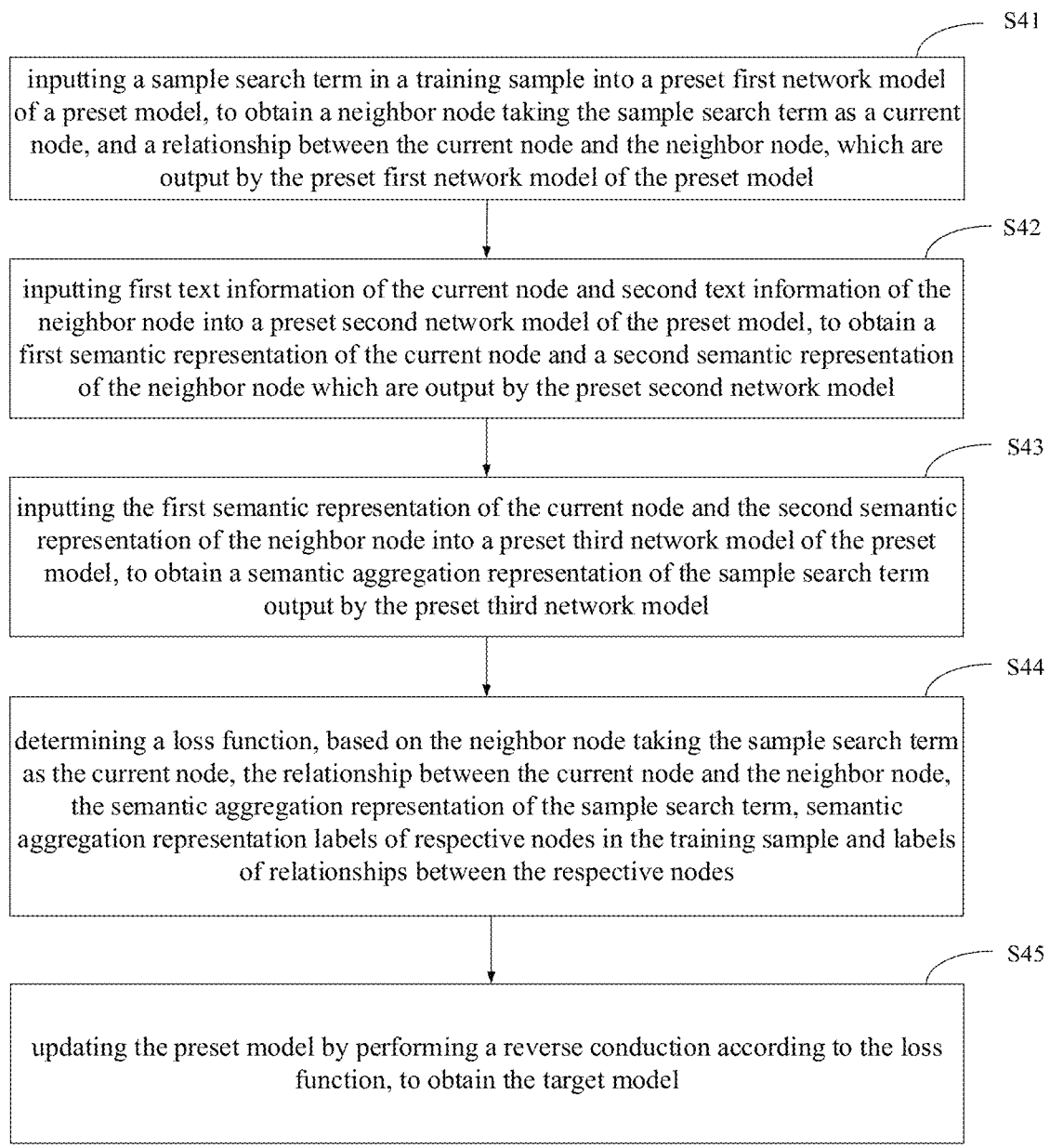
FIG. 4 is a flowchart of training a target model according to an embodiment of the present disclosure.

In an embodiment of the present disclosure, on the basis of implementing any of the above methods, as shown in FIG. 4, the method of training a target model may include:

S41, inputting a sample search term in a training sample into a preset first network model of a preset model, to obtain a neighbor node taking the sample search term as a current node, and a relationship between the current node and the neighbor node, which are output by the preset first network model of the preset model;

S42, inputting first text information of the current node and second text information of the neighbor node into a preset second network model of the preset model, to obtain a first semantic representation of the current node and a second semantic representation of the neighbor node which are output by the preset second network model;

S43, inputting the first semantic representation of the current node and the second semantic representation of the neighbor node into a preset third network model of the preset model, to obtain a semantic aggregation representation of the sample search term output by the preset third network model;

S44, determining a loss function, based on the neighbor node taking the sample search term as the current node, the relationship between the current node and the neighbor node, the semantic aggregation representation of the sample search term, semantic aggregation representation labels of respective nodes in the training sample and labels of relationships between the respective nodes; and S35, updating the preset model by performing a reverse conduction according to the loss function, to obtain the target model.

Before training a preset model, a training sample is required to be constructed on the basis of a constructed text graph, and the preset model is trained by adopting a technology combining graph learning and semantic representation. Herein, positive and negative samples are respectively as follows:

Positive sample: two nodes with an edge in the text graph;
Negative sample: two nodes without edge connections in the text graph.

Here, an edge means that there is a relationship between two nodes, and no edge means that there is no relationship between two nodes.

Figure 5:
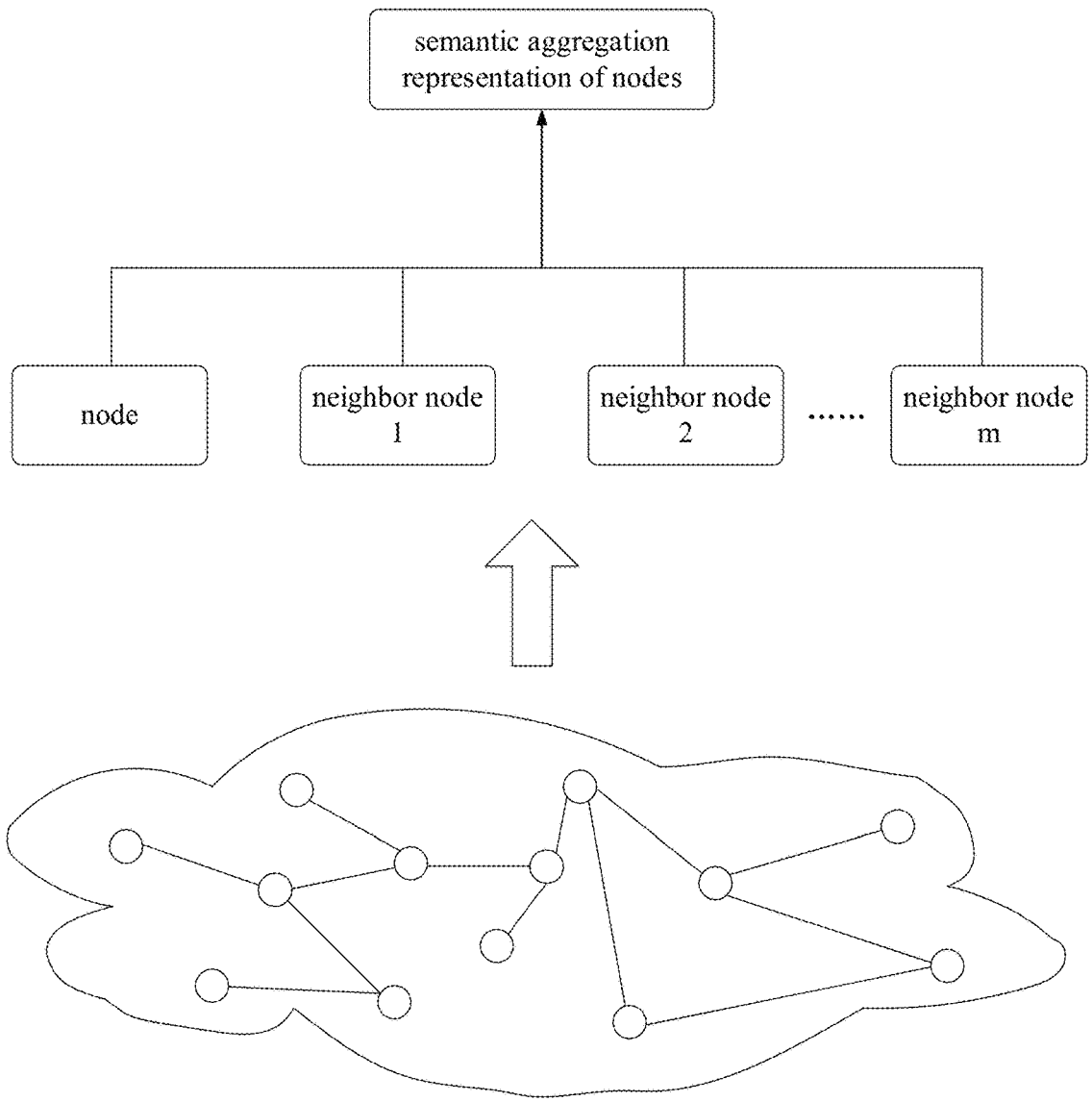
FIG. 5 is a schematic diagram of acquiring a semantic aggregation representation in an embodiment of the present disclosure.

FIG. 5 shows a schematic diagram of acquiring a semantic aggregation representation. A composition relationship according to a text graph is equivalent to acquiring an intention of a semantic cluster. Each node captures semantic information of itself and surrounding nodes thereof simultaneously, and acquires a semantic representation vector of each node. By this time, the semantic representation of the node is a representation which aggregates s of the node itself and the neighbor node, i.e., a semantic aggregation representation. The semantic representation vector of each node can be acquired by executing a prediction process by the trained target model. By this time, the semantic representation of the node is a semantic representation of the cluster of the node itself and the neighbor node. Therefore, a user search intention can be captured more accurately by performing the index recall by the aggregated semantic representation, thereby recalling the expanded search term related to the user search intention.

Figure 6:
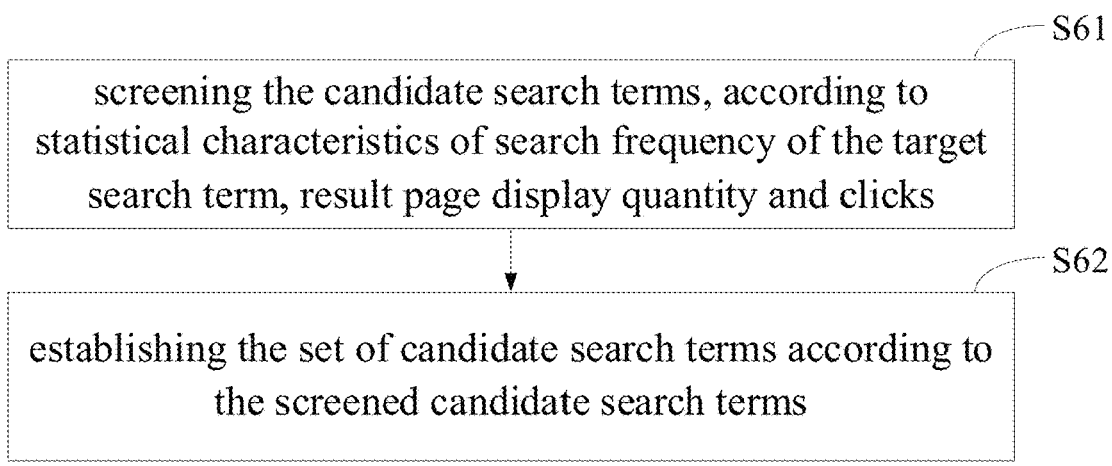
FIG. 6 is a flowchart of establishing a set of candidate terms according to an embodiment of the present disclosure.

In order to determine a more accurate candidate search term to be recommended based on an input target search term, a set of candidate search terms needs to be established in advance. In the embodiment of the present disclosure, on the basis of implementing any of the above methods, as shown in FIG. 6, the method may further include:

S61, screening the candidate search terms, according to statistical characteristics of search frequency of the target search term, result page display quantity and clicks; and S62, establishing the set of candidate search terms according to the screened candidate search terms.

The search frequency refers to the number of searches for one or some search terms within a certain period of time. For example, in a case where the number of searches for "AAA" is 100 in the time of day, the search frequency for the search term "AAA" is 100.

The result page display quantity refers to the result page display quantity of a search term on a preset website, and the preset website includes websites with statistical values, such as official websites, civilian websites with good reputation and the like. For example, the result page display quantity may refers to the number of displays of an article on an official web site or of a high quality author.

The clicks refers to the number of times a certain search term or certain search terms are clicked within a certain period of time.

In the above implementation, the candidate search terms are screened according to the statistical characteristics of the search frequency of the target search term, and the result page display quantity and the clicks of the preset website, so that all the candidate search terms in the set of candidate search terms are high-quality candidate search terms, and the capability of the set of candidate search terms for covering the user search intention is stronger. Therefore, candidate search terms to be recommended which are more consistent with the user search intention can be recalled from the search term set, providing more accurate candidate search terms to be recommended for a user.

Figure 7:
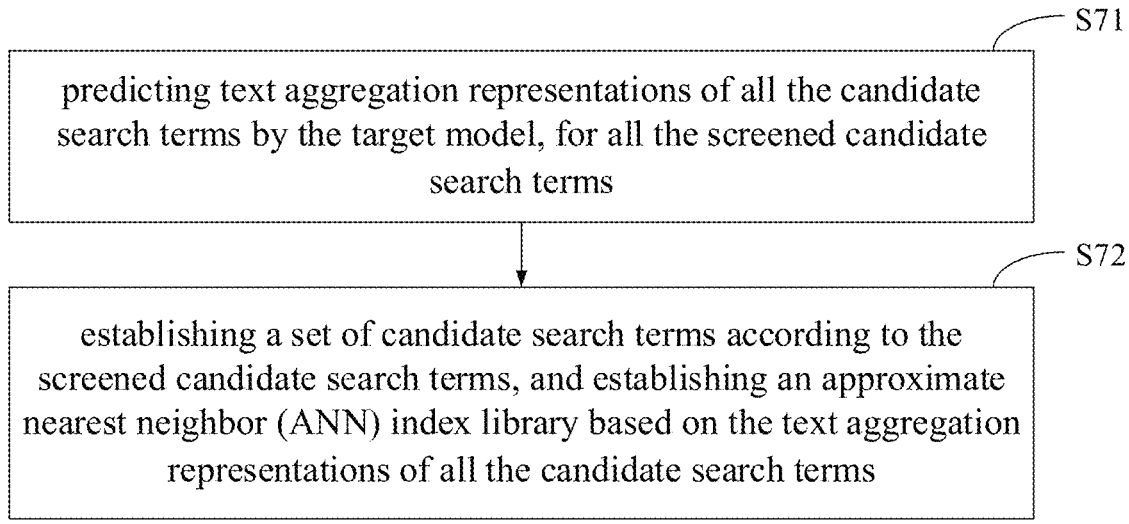
FIG. 7 shows an example of establishing a set of candidate search terms in an embodiment of the present disclosure.

According to the examples of the present disclosure, on the basis of realizing any of the above methods, as shown in FIG. 7, the establishing the set of candidate search terms according to the screened candidate search terms includes:
   S71, predicting semantic aggregation representations of all the candidate search terms by a target model, for all the screened candidate search terms; and
   S72, establishing the ANN index library, based on the semantic aggregation representations of all the candidate search terms.

In the above implementation, the ANN index library is established based on the semantic aggregation representations of all the candidate search terms, to provide support for recalling the candidate search terms to be recommended based on the approximate nearest neighbor service, so that a recall speed is increased and search experience of a user is improved.

Figure 8:
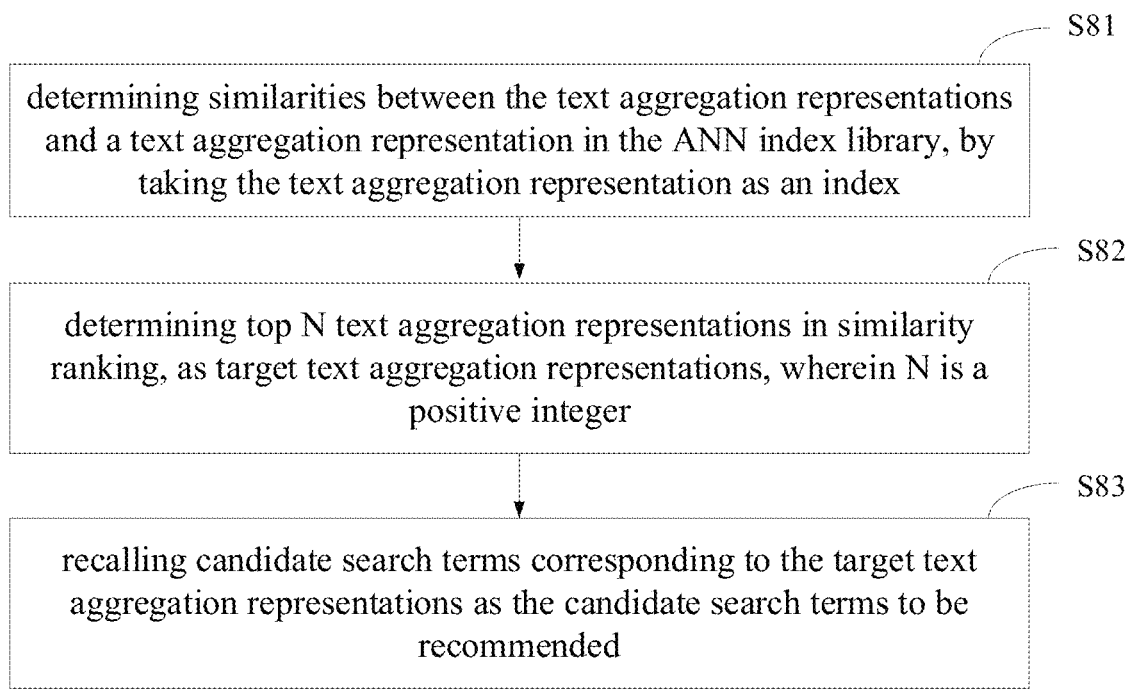
FIG. 8 is an example of recalling a candidate search term to be recommended from a set of candidate search terms in an embodiment of the present disclosure.

In the embodiments of the present disclosure, on the basis of realizing any of the above methods, in some implementations, and as shown in FIG. 8, the recalling the candidate search term to be recommended from the set of candidate search terms, by taking the semantic aggregation representation of the target search term as the index in S15, includes:
   S81, determining similarities between the semantic aggregation representations of all the candidate search terms and a semantic aggregation representation in the ANN index library, by taking the semantic aggregation representation of the target search term as the index;
   S82, determining top N semantic aggregation representations in similarity ranking, as target semantic aggregation representations, wherein N is a positive integer; and
   S83, recalling candidate search terms corresponding to the target semantic aggregation representations as the candidate search terms to be recommended.

The value of N can be set according to user requirements or requirements or terminal types.

In the above implementation, the top N target text aggregation representations are determined by calculating the similarity of the text aggregation representations, the candidate search terms corresponding to the target text aggregation representations are determined as candidate search terms to be recommended, so that the candidate search terms which are more consistent with the user search intention can be recalled from the set of candidate search terms, thereby facilitating to solve the problem of a poor search effect caused by incorrect or inaccurate input of the target search term or the search term belonging to non-high-frequency search terms.

Figure 9:
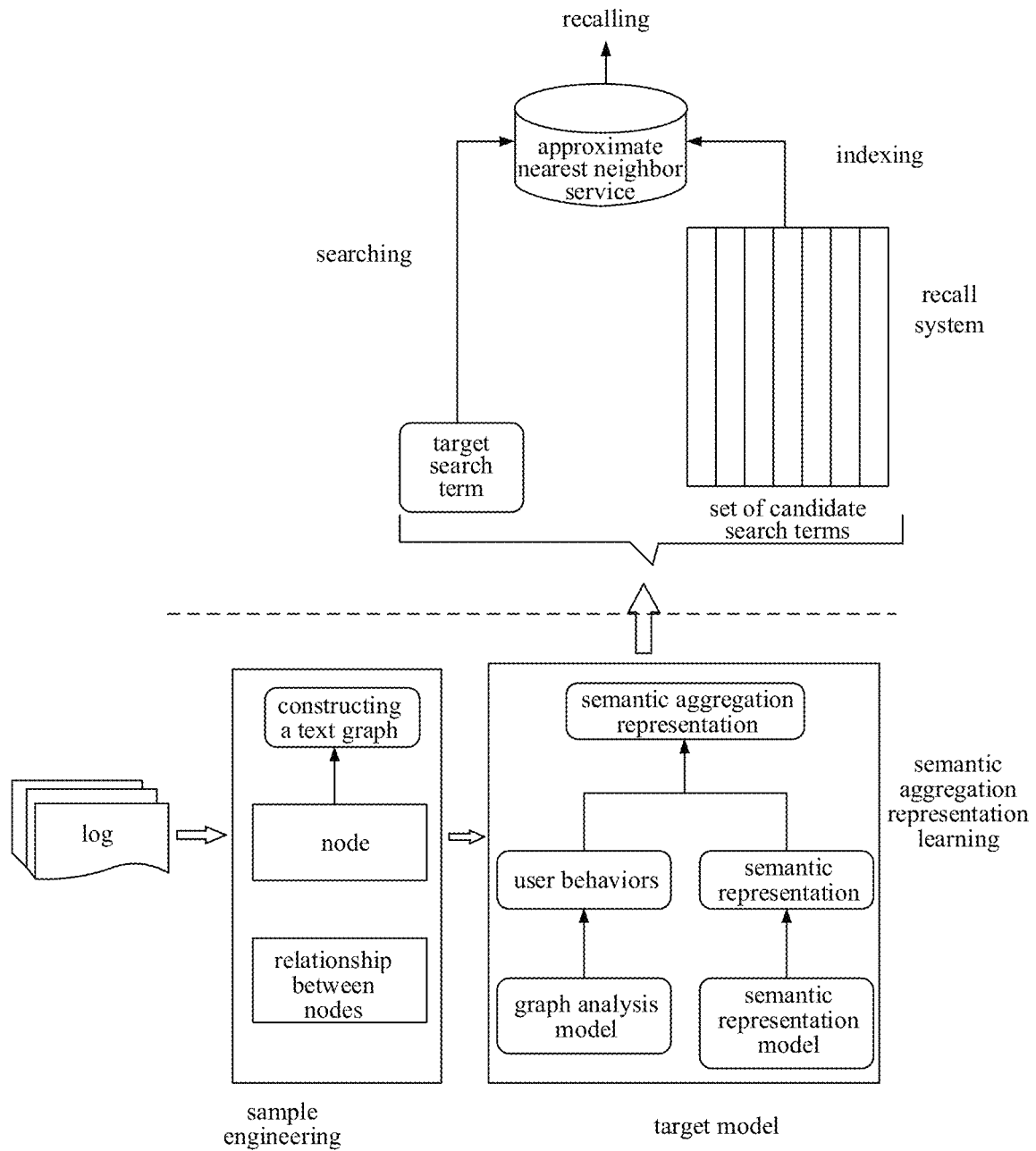
FIG. 9 is a schematic diagram of an architecture for implementing search term recommendation in an embodiment of the present disclosure.

FIG. 9 shows a schematic diagram of an architecture of search term recommendation. It can be seen from FIG. 9 that the architecture mainly includes two parts, semantic aggregation representation learning and a recall system. The part of semantic aggregation representation learning is mainly responsible for training a preset model according to a training sample, to obtain the semantic aggregation representation of a search term by the trained target model. The part of recall system is mainly responsible for recalling a candidate search term with a high similarity with the semantic aggregation representation of the search term from the candidate term set based on the Approximate Nearest Neighbor (ANN), and finally displaying the candidate search term to a user terminal. Specifically, the semantic aggregation representation learning is also divided into two parts, the first part is a sample engineering part, which is mainly responsible for mining a plurality of nodes and the relationships (which may be recorded as edge relationships) between respective nodes in the plurality of nodes from a search log according to user interaction behaviors, and constructing a text graph according to the plurality of nodes and the edge relationships between the respective nodes in the plurality of nodes; and the second part is a target model part, which is mainly responsible for obtaining the semantic aggregation representations of all nodes. The target model includes a graph analysis model and a semantic representation model. Multi-order neighbor nodes of a node are acquired by the graph analysis model; and the semantic representations of the node itself and the neighbor node are acquired by the semantic representation model. Furthermore, the target model performs aggregation representation processing on text information of the node itself and the neighbor node to obtain the semantic aggregation representation. Illustratively, for example, the graph analysis model employs a graph convolutional network (GCN), and the semantic representation model employs an enhanced representation from knowledge integration (ERNIE). Therefore, the search intention of a user can be captured more accurately by fully mining user behavior characteristics and text characteristics in a search scenario, aggregating the semantic aggregation representations of the search terms by combining the semantic representation and the graph learning method, and recalling the candidate search terms to be recommended based on the approximate nearest neighbor. Compared with other existing methods, it has a stronger recall ability and can a recall recommendation result more consistent with the intention.

It should be understood that the architecture depicted in FIG. 9 is an alternative implementation, and that various obvious changes and/or substitutions may be made by those skilled in the art based on the instance of FIG. 9, while the obtained technical solution still remains within the scope of the embodiments of the present disclosure.

The method for recommending a search term provided by the present disclosure can be used in items such as search engines or search recommendation. Illustratively, the executive body for the method may be an electronic device, which may be various search engine devices, such as search engine servers.

Figure 10:
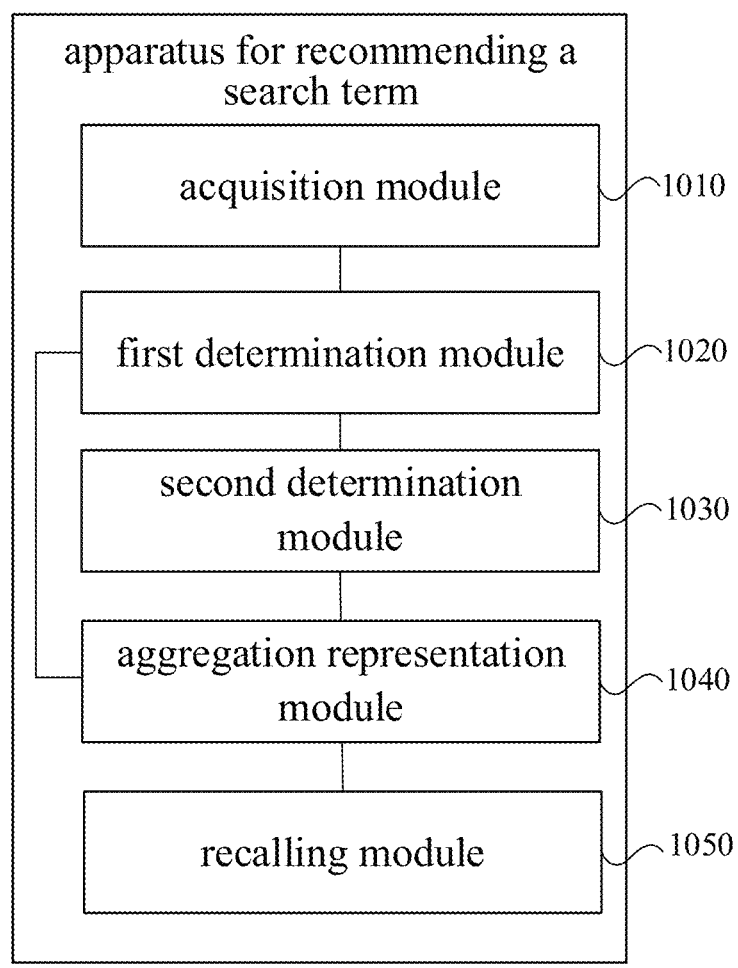
FIG. 10 is a schematic diagram for an apparatus for recommending a search term according to an embodiment of the present disclosure.

As an implementation for the various methods, the present disclosure also provides an apparatus for recommending a search term. FIG. 10 shows a schematic diagram of an apparatus for recommending a search term. As shown in FIG. 10, the apparatus includes:

- an acquisition module 1010 configured for acquiring an input target search term;
- a first determination module 1020 configured for determining a neighbor node of a current node and a relationship between the current node and the neighbor node, by taking the target search term as the current node;
- a second determination module 1030 configured for performing semantic representation processing on first text information of the current node and second text information of the neighbor node respectively, to obtain a first semantic representation of the current node and a second semantic representation of the neighbor node;
- an aggregation representation module 1040 configured for determining a semantic aggregation representation of the target search term, based on the first semantic representation, the second semantic representation and the relationship between the current node and the neighbor node; and
- a recalling module 1050 configured for recalling a candidate search term to be recommended from a set of candidate search terms, by taking the semantic aggregation representation as an index.

Figure 11:
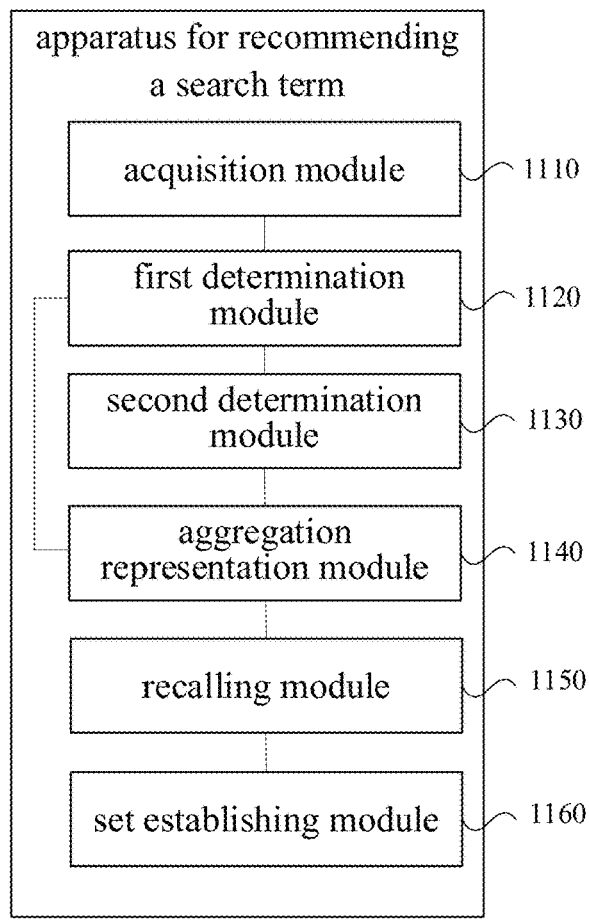
FIG. 11 is a flowchart for an apparatus for recommending a search term according to another embodiment of the present disclosure.

In some embodiments, as shown in FIG. 11, the apparatus further includes:

- a set establishing module 1160 configured for:
  - screening the candidate search terms, according to statistical characteristics of search frequency of the target search term, result page display quantity and clicks; and
  - establishing the set of candidate search terms according to the screened candidate search terms.

An acquisition module 1110, a first determination module 1120, a second determination module 1130, an aggregation representation module 1140 and a recalling module 1150 shown in FIG. 11 are modules same as or similar to the acquisition module 1010, the first determination module 1020, the second determination module 1030, the aggregation representation module 1040 and the recalling module 1050 shown in FIG. 10, respectively.

In some embodiments, the set of candidate search terms is present in a form of an approximate nearest neighbor (ANN) index library, and the set establishing module 1060 is further configured for:

- predicting semantic aggregation representation of all the candidate search terms by a target model, for all the screened candidate search terms; and
- establishing the ANN index library, based on the semantic aggregation representations of all the candidate search terms.

In some embodiments, the recalling module 1040 is configured for:

- determining similarities between the semantic aggregation representations and a semantic aggregation representation in the ANN index library, by taking the semantic aggregation representation as the index;
- determining top N semantic aggregation representations in similarity ranking, as target semantic aggregation representations, wherein N is a positive integer; and
- recalling candidate search terms corresponding to the target semantic aggregation representations as the candidate search terms to be recommended.

The function of each module in each apparatus of the embodiment of the present disclosure can be described by referring to the corresponding description in the above-mentioned method for recommending a search term, and will not be described in detail herein.

The apparatus for recommending a search term according to the present embodiment determines a neighbor node of a current node by taking the target search term as the current node, determines a semantic aggregation representation of the target search term based on the first text information of the current node and the second text information of the neighbor node, and recalls a candidate search term to be recommended from a set of candidate search terms, by taking the semantic aggregation representation as an index. Compared with determining a candidate search term only according to a semantic representation corresponding to a current node, because the semantic aggregation representation is a semantic representation of a cluster aggregated by the current node and the neighbor node, it solves the problem of a poor search effect caused by the problems of uncertainty or inaccuracy of the target search term input by a user and the like to the search operation, so that more accurate candidate search terms to be recommended can be recalled, thereby helping the user to search according to the recommended candidate search term. Thus, the searching operation process is simplified, the searching difficulty is reduced, the searching efficiency of the user is improved, and the searching experience of the user is improved.

Figure 12:
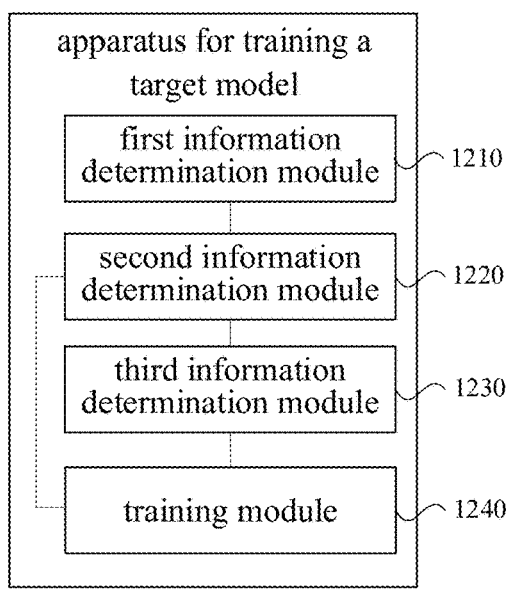
FIG. 12 is a schematic diagram of an apparatus for training a target model according to an embodiment of the present disclosure.

As an implementation for the above various methods, the present disclosure further provides an apparatus for training a target model. FIG. 12 shows a schematic view of the apparatus for training a target model. As shown in FIG. 12, the apparatus includes:

- a first information determination module 1210 configured for inputting a sample search term in a training sample into a preset first network model of a preset model, to obtain a neighbor node taking the sample search term as a current node, and a relationship between the current node and the neighbor node, which are output by the preset first network model of the preset model;
- a second information determination module 1220 configured for inputting first text information of the current node and second text information of the neighbor node into a preset second network model of the preset model, to obtain a first semantic representation of the current node and a second semantic representation of the neighbor node which are output by the preset second network model;
- a third information determination module 1230 configured for inputting the first semantic representation of the current node and the second semantic representation of the neighbor node into a preset third network model of the preset model, to obtain a semantic aggregation representation of the sample search term output by the preset third network model; and
- a training module 1240 configured for determining a loss function, based on the neighbor node taking the sample search term as the current node, the relationship between the current node and the neighbor node, the semantic aggregation representation of the sample search term, semantic aggregation representation labels of respective nodes in the training sample and labels of relationships between the respective nodes; and updating the preset model by performing a reverse conduction according to the loss function, to obtain the target model.

Figure 13:
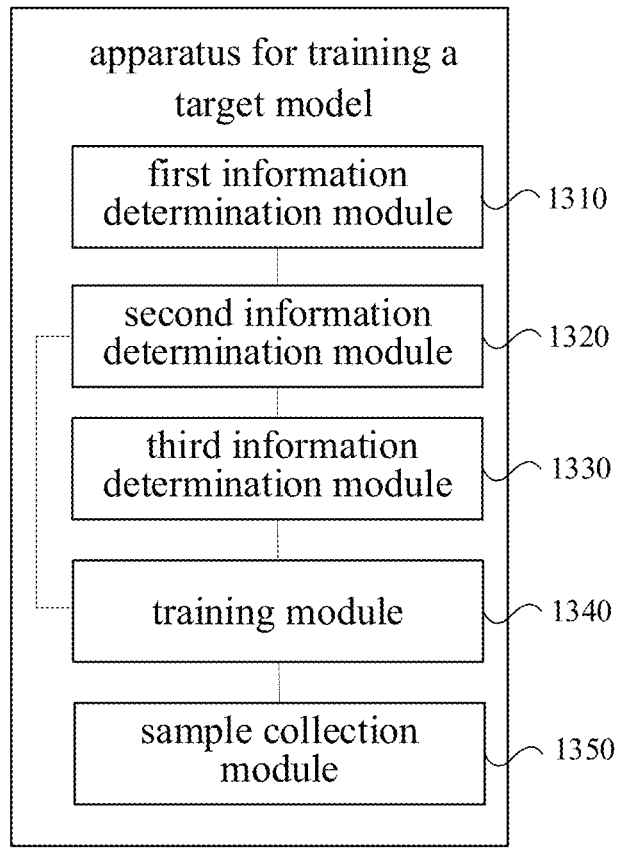
FIG. 13 is a schematic diagram of an apparatus for training a target model according to an embodiment of the present disclosure.

In some implementations, as shown in FIG. 13, the apparatus further includes:

a sample collection module 1350 configured for:

mining a plurality of nodes and the relationships between the respective nodes in the plurality of nodes from a search log, based on user interaction behaviors, wherein the nodes at least includes one type of nodes of the sample search term and a sample webpage title;

constructing a text graph, according to the plurality of nodes and the relationships between the respective nodes in the plurality of nodes; and generating a training sample based on the text graph.

A first information determination module 1310, a second information determination module 1320, a third information determination module 1330 and a training module 1340 shown in FIG. 13 are modules same as or similar to the first information determination module 1210, the second information determination module 1220, the third information determination module 1230 and the training module 1240 shown in FIG. 12, respectively.

In some implementations, manners in which the sample collection module 1350 determines the relationship between the respective nodes in the plurality of nodes include at least one of:

determining a first type of relationship between the sample search terms;

determining a second type of relationship between the sample search term and the sample webpage title; and determining a third type of relationship between the sample webpage titles.

In some implementations, the sample collection module 1350 is specifically configured for:

determining the relationships between the respective nodes in the plurality of nodes, which includes at least one of:

determining at least one of a co-occurrence relationship in which two sample search terms simultaneously appear in one search time domain, a co-display relationship in which two sample search terms display a same sample webpage title together, and a concurrent relationship in which two sample search terms click a same sample webpage title together, as the first type of relationship between the sample search terms;

determining at least one of a display relationship in which a sample webpage title is recalled and displayed in a scenario of searching a search term, a click relationship in which a webpage title is clicked in a scenario of searching a sample search term, and a text matching relationship in which a sample search term and a webpage title have a text containing relationship, as the second type of relationship between the sample search term and the sample webpage title; and determining at least one of a co-display relationship in which two sample webpage titles are displayed simultaneously in a same search and a concurrent relationship in which two sample webpage titles are clicked simultaneously in a same search, as the third type of relationship between the sample webpage titles.

The function of each module in each apparatus of the embodiment of the present disclosure can be described by referring to the corresponding description in the above-mentioned method for training a target model, and will not be described in detail herein.

The apparatus for training a target model can enable the target model to output a semantic aggregation representation.

According to embodiments of the present disclosure, the present disclosure also provides an electronic device, a readable storage medium and a computer program product.

Figure 14:
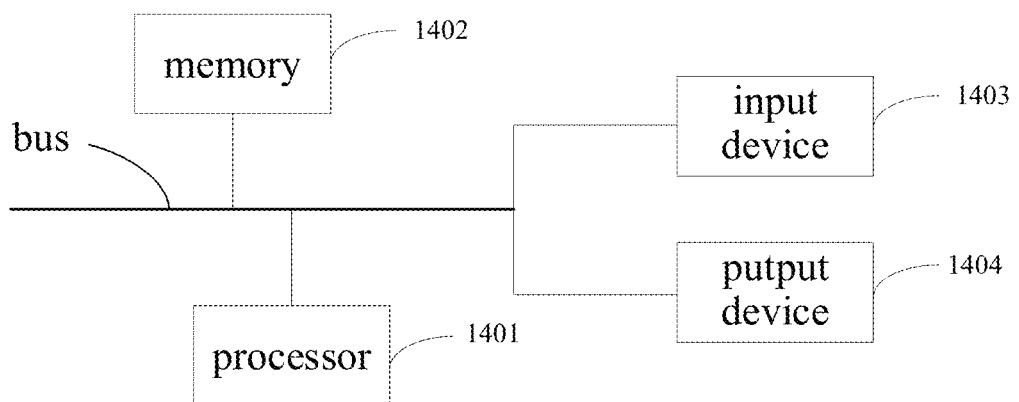
FIG. 14 is a block diagram of an electronic device used to implement a method for recommending a search term according to an embodiment of the present disclosure.

FIG. 14 is a block diagram of an electronic device for implementing the method for recommending a search term according to an embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the application described and/or claimed herein.

As shown in FIG. 14, the electronic device may include one or more processors 1401, a memory 1402, and interfaces for connecting components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 1401 is shown in FIG. 14.

The memory 1402 is a non-transitory computer-readable storage medium provided herein. The memory stores instructions executable by at least one processor to cause the at least one processor to execute the method for recommending a search term provided herein. The non-transitory computer-readable storage medium of the present disclosure stores computer instructions for enabling a computer to execute the method for recommending a search term provided herein.

The memory 1402, as a non-transitory computer-readable storage medium, may be configured to store non-transitory software programs, non-transitory computer executable programs and modules, such as program instructions/modules corresponding to the method for recommending a search term in the embodiment of the present disclosure. The processor 1401 executes various functional applications and data processing of the server by running the non-transitory software programs, instructions and modules stored in the memory 1402, that is, implements the method for recommending a search term in the above method embodiment.

The memory 1402 may include a program storage area and a data storage area, wherein the program storage area may store an operating system, and an application program required for at least one function; and the data storage area may store data created according to the use of the electronic device for implementing the method for recommending a search term. In addition, the memory 1402 may include a high speed random access memory, and may also include a non-transitory memory, such as at least one disk storage device, a flash memory device, or other non-transitory solid state storage devices. In some embodiments, the memory 1402 may optionally include memories remotely located with respect to the processor 1401, and these remote memories may be connected, via a network, to the electronic device for implementing the method for recommending a search term. Examples of such networks may include, but are not limited to, the Internet, an intranet, a local area network, a mobile communication network and combinations thereof.

The electronic device for implementing the method for recommending a search term may further include an input device 1403 and an output device 1404. The processor 1401, the memory 1402, the input device 1403, and the output device 1404 may be connected by a bus or in other ways, and the bus connection is taken as an example in FIG. 14.

The input device 1403 may receive input digital or character information, and generate a key signal input related to a user setting and a functional control of electronic device for implementing the method for recommending a search term. For example, the input device may be a touch screen, a keypad, a mouse, a track pad, a touch pad, a pointer stick, one or more mouse buttons, a track ball, a joystick, and other input devices. The output device 1404 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

According to an embodiment of the present disclosure, the present disclosure also provides an electronic device. The device may include:
  one or more processors; and
  a storage for storing one or more programs, and in a case where the one or more programs are executed by the one or more processors, the one or more processors are enabled to implement the method in the above method embodiment.

Among other things, the functions and implementations of the processor and memory of the electronic device may refer to the above description of the processor and memory in the embodiment of the electronic device.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, also called as a cloud computing server or a cloud host, which is a host product in a cloud computing service system, to solve the defects of difficult management and weak business expansibility in the services of the traditional physical host and the virtual private server (VPS). The server may also be a server of a distributed system, or a server incorporating a blockchain.

The technical solution of the embodiment of the present disclosure determines a neighbor node of a current node by taking the target search term as the current node, determines a semantic aggregation representation of the target search term based on the first text information of the current node and the second text information of the neighbor node, and recalls a candidate search term to be recommended from a set of candidate search terms, by taking the semantic aggregation representation as an index. Compared with determining a candidate search term only according to a semantic representation corresponding to a current node, because the semantic aggregation representation is a semantic representation of a cluster aggregated by the current node and the neighbor node, it solves the problem of a poor search effect caused by the problems of uncertainty or inaccuracy of the input target search term and the like to the search operation, so that more accurate candidate search terms to be recommended can be recalled, thereby helping the user to search according to the recommended candidate search term. Thus, the searching operation process is simplified, the searching difficulty is reduced, the searching efficiency of the user is improved, and the searching experience of the user is improved.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A method for recommending a search term, comprising:
   acquiring an input target search term;
   determining a neighbor node of a current node and a relationship between the current node and the neighbor node, by taking the target search term as the current node;
   performing semantic representation processing on first text information of the current node and second text information of the neighbor node respectively, to obtain a first semantic representation of the current node and a second semantic representation of the neighbor node;
   generating a cluster of the current node and the neighbor node based on the first semantic representation, the second semantic representation and the relationship between the current node and the neighbor node, and determining a semantic aggregation representation of the target search term by aggregating a semantic representation of the cluster; and
   recalling a candidate search term to be recommended from a set of candidate search terms, by taking the semantic aggregation representation of the target search term as an index,
   wherein determining the neighbor node of the current node by taking the target search term as the current node comprises acquiring display webpage information during searching, and determining a webpage title in the display webpage information as the neighbor node.

2. The method of claim 1, further comprising:
   screening the candidate search terms, according to statistical characteristics of search frequency of the target search term, result page display quantity and clicks; and
   establishing the set of candidate search terms according to the screened candidate search terms.

3. The method of claim 2, wherein the set of candidate search terms is present in a form of an approximate nearest neighbor (ANN) index library, and the establishing the set of candidate search terms according to the screened candidate search terms, comprises:
   predicting semantic aggregation representations of all the candidate search terms, for all the screened candidate search terms; and
   establishing the ANN index library, based on the semantic aggregation representations of all the candidate search terms.

4. The method of claim 3, wherein the recalling the candidate search term to be recommended from the set of candidate search terms, by taking the semantic aggregation representation of the target search term as the index, comprises:
   determining similarities between the semantic aggregation representations of all the candidate search terms and a semantic aggregation representation in the ANN index library, by taking the semantic aggregation representation of the target search term as the index;
   determining top N semantic aggregation representations in similarity ranking, as target semantic aggregation representations, wherein N is a positive integer; and
   recalling candidate search terms corresponding to the target semantic aggregation representations as the candidate search terms to be recommended.

5. An electronic device, comprising:
   at least one processor; and
   a memory communicatively connected with the at least one processor, wherein
   the memory stores instructions executable by the at least one processor, the instructions being executed by the at least one processor to enable the at least one processor to perform operations of:
   acquiring an input target search term;
   determining a neighbor node of a current node and a relationship between the current node and the neighbor node, by taking the target search term as the current node;
   performing semantic representation processing on first text information of the current node and second text information of the neighbor node respectively, to obtain a first semantic representation of the current node and a second semantic representation of the neighbor node;
   generating a cluster of the current node and the neighbor node based on the first semantic representation, the second semantic representation and the relationship between the current node and the neighbor node, and determining a semantic aggregation representation of the target search term by aggregating a semantic representation of the cluster; and
   recalling a candidate search term to be recommended from a set of candidate search terms, by taking the semantic aggregation representation of the target search term as an index,
   wherein determining the neighbor node of the current node by taking the target search term as the current node comprises acquiring display webpage information during searching, and determining a webpage title in the display webpage information as the neighbor node.

6. The electronic device of claim 5, wherein the instructions are executable by the at least one processor to enable the at least one processor to further perform operations of:
   screening the candidate search terms, according to statistical characteristics of search frequency of the target search term, result page display quantity and clicks; and
   establishing the set of candidate search terms according to the screened candidate search terms.

7. The electronic device of claim 6, wherein the set of candidate search terms is present in a form of an approximate nearest neighbor (ANN) index library, and the establishing the set of candidate search terms according to the screened candidate search terms, comprises:
   predicting semantic aggregation representations of all the candidate search terms, for all the screened candidate search terms; and establishing the ANN index library, based on the semantic aggregation representations of all the candidate search terms.

8. The electronic device of claim 7, wherein the recalling the candidate search term to be recommended from the set of candidate search terms, by taking the semantic aggregation representation of the target search term as the index, comprises:
determining similarities between the semantic aggregation representations of all the candidate search terms and a semantic aggregation representation in the ANN index library, by taking the semantic aggregation representation of the target search term as the index;
determining top N semantic aggregation representations in similarity ranking, as target semantic aggregation representations, wherein N is a positive integer; and
recalling candidate search terms corresponding to the target semantic aggregation representations as the candidate search terms to be recommended.

9. A non-transitory computer-readable storage medium storing computer instructions for enabling a computer to perform operations of:
acquiring an input target search term;
determining a neighbor node of a current node and a relationship between the current node and the neighbor node, by taking the target search term as the current node;
performing semantic representation processing on first text information of the current node and second text information of the neighbor node respectively, to obtain a first semantic representation of the current node and a second semantic representation of the neighbor node;
generating a cluster of the current node and the neighbor node based on the first semantic representation, the second semantic representation and the relationship between the current node and the neighbor node, and determining a semantic aggregation representation of the target search term by aggregating a semantic representation of the cluster; and
recalling a candidate search term to be recommended from a set of candidate search terms, by taking the semantic aggregation representation of the target search term as an index,
wherein determining the neighbor node of the current node by taking the target search term as the current node comprises acquiring display webpage information during searching, and determining a webpage title in the display webpage information as the neighbor node.

10. The non-transitory computer-readable storage medium of claim 9, wherein the computer instructions are executable by the computer to enable the computer to further perform operations of:
screening the candidate search terms, according to statistical characteristics of search frequency of the target search term, result page display quantity and clicks; and
establishing the set of candidate search terms according to the screened candidate search terms.

11. The non-transitory computer-readable storage medium of claim 10, wherein the set of candidate search terms is present in a form of an approximate nearest neighbor (ANN) index library, and the establishing the set of candidate search terms according to the screened candidate search terms, comprises:
predicting semantic aggregation representations of all the candidate search terms, for all the screened candidate search terms; and
establishing the ANN index library, based on the semantic aggregation representations of all the candidate search terms.

12. The non-transitory computer-readable storage medium of claim 11, wherein the recalling the candidate search term to be recommended from the set of candidate search terms, by taking the semantic aggregation representation of the target search term as the index, comprises:
determining similarities between the semantic aggregation representations of all the candidate search terms and a semantic aggregation representation in the ANN index library, by taking the semantic aggregation representation of the target search term as the index;
determining top N semantic aggregation representations in similarity ranking, as target semantic aggregation representations, wherein N is a positive integer; and
recalling candidate search terms corresponding to the target semantic aggregation representations as the candidate search terms to be recommended.

* * * * *